United States Patent
Blancha

[15] 3,667,681
[45] June 6, 1972

[54] PLASTIC BEARING FOR AN AIRLESS SPRAY GUN

[72] Inventor: Erwin B. Blancha, Sterling Heights, Mich.

[73] Assignee: General Motors Corporation, Detroit, Mich.

[22] Filed: Oct. 21, 1970

[21] Appl. No.: 82,716

[52] U.S. Cl..............................239/393, 239/602, 308/72
[51] Int. Cl..........................................................B05b 15/02
[58] Field of Search............239/393, 412, 602, 587, DIG. 4, 239/392; 308/72, 238

[56] References Cited

UNITED STATES PATENTS

| 3,116,882 | 1/1964 | Vork | 239/391 X |
| 3,319,893 | 5/1967 | Rodgers et al. | 239/393 |

FOREIGN PATENTS OR APPLICATIONS

| 155,216 | 7/1938 | Germany | 239/393 |

Primary Examiner—M. Henson Wood, Jr.
Assistant Examiner—Michael Y. Mar
Attorney—W. E. Finken and Herbert Furman

[57] ABSTRACT

A plastic disc-like bearing for a turret member housing of an airless spray gun includes a roughened generally spherical outer surface that engages a generally spherical seat of the housing. An integral peripheral flange of the bearing has a roughened surface that engages a flange seat of the housing adjacent the periphery of the spherical seat. A smooth generally spherical inner surface of the bearing engages a generally spherical turret member received within the housing and a conventional plastic ring cooperates with the plastic bearing to support the turret member for rotational movement between a spraying position and a non-spraying position. In the spraying position, a spraying orifice of the turret member faces outwardly of apertures in the plastic bearing and the housing, the aperture of the bearing being the smaller of the two.

2 Claims, 3 Drawing Figures

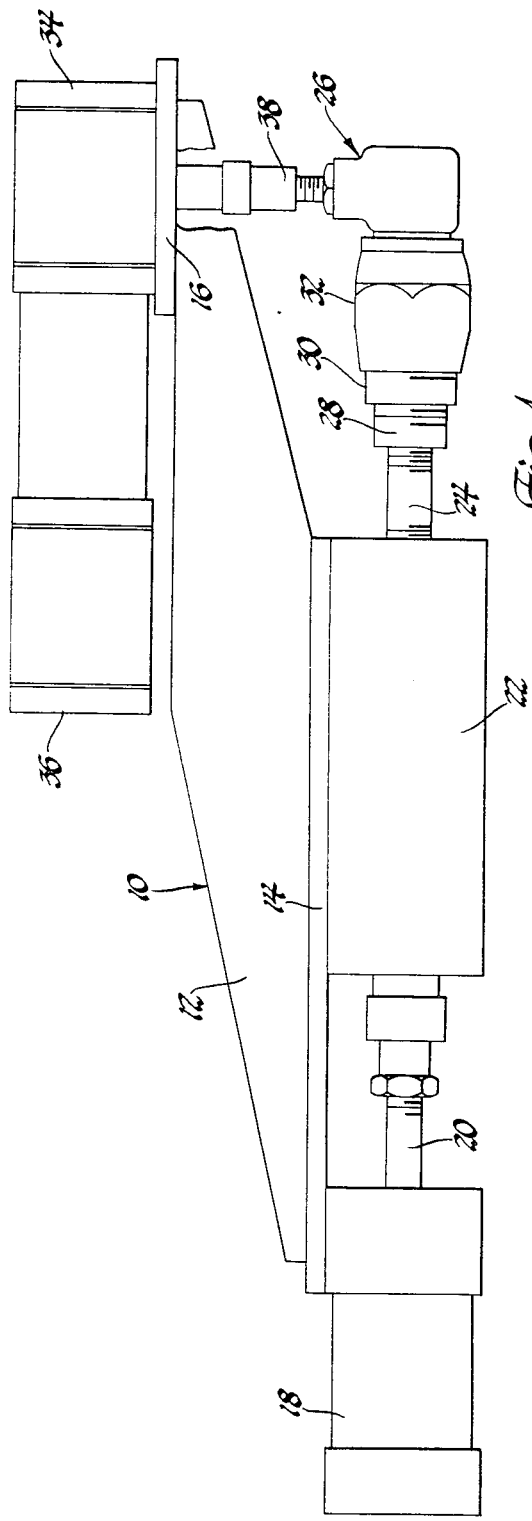
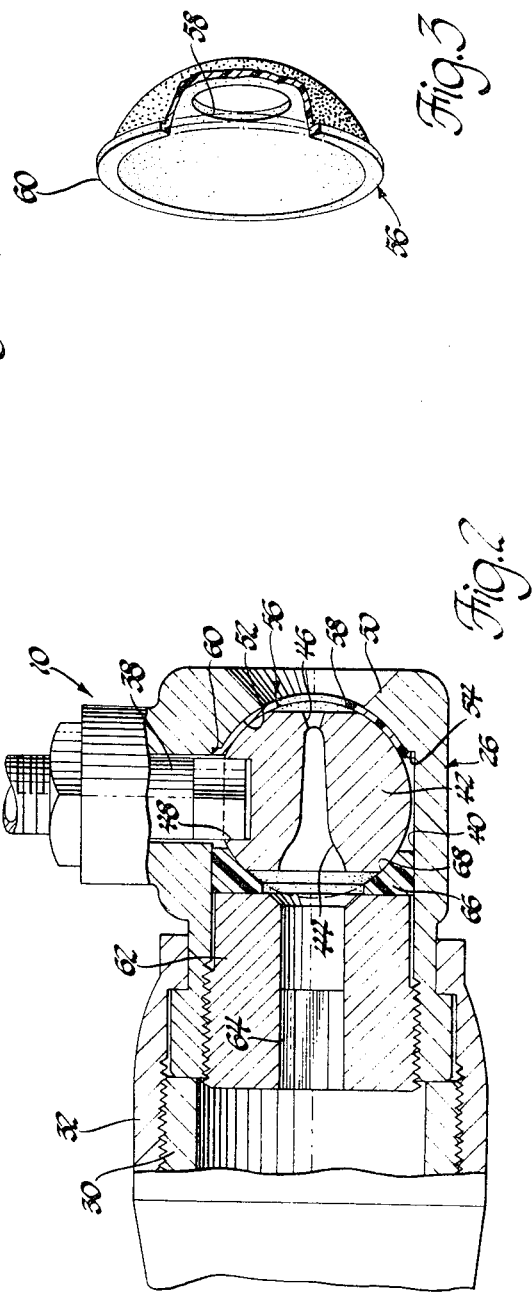
INVENTOR.
Erwin B. Blancha
BY
Herbert Furman
ATTORNEY

PLASTIC BEARING FOR AN AIRLESS SPRAY GUN

This invention relates to a disc-like plastic bearing for a turret member housing of an airless spray gun.

It is well known to provide an airless spray gun which includes a housing that supports a turret member for rotational movement 180° between a spraying position and a non-spraying position in which reverse fluid flow through a spraying orifice of the turret member unclogs the spraying orifice of accumulated matter. To prevent the fluid which is sprayed from building up in layers on the turret member and/or the housing, the housing engages the turret member with a relatively high pressure therebetween. If this engagement is metal-to-metal, an exorbitantly high torque is required to rotate the turret member between the spraying and non-spraying positions. As such, it is conventional to use plastic rings that include spherical portions that engage and thus rotatably support the turret member. Due to the high pressure these rings are subjected to, they have a tendency to plastically deform and, as such, must be occasionally replaced to allow smooth rotation of the turret member. Since the ring adjacent the spraying orifice, with the turret member in spraying position, is particularly inaccessible, its replacement is somewhat difficult.

This invention provides an improved disc-like plastic bearing for a turret member housing of an airless spray gun which has a minimum tendency to plastically deform and is readily accessible for replacement.

One feature of this invention is that it provides a disc-like plastic bearing for a turret member housing of an airless spray gun in which the bearing has a roughened generally spherical outer surface that engages a generally spherical seat of the housing and a smooth generally spherical inner surface that engages the turret member received within the housing.

Another feature of this invention is that the bearing includes an integral peripheral flange with a roughened surface that engages a flange seat of the housing.

Yet another feature of this invention is that the fluid is sprayed outwardly of the housing through apertures in the plastic bearing and the housing and the bearing aperture is the smaller of the two such that the bearing is readily accessible for replacement.

These and other features of this invention will be apparent from the following description and drawings in which:

FIG. 1 is a partially broken away elevation view of an airless spray gun that includes a turret member mounted within a housing by a plastic bearing according to the invention;

FIG. 2 is an enlarged partially sectioned view of the housing of FIG. 1 showing the bearing supporting the turret member; and FIG. 3 is a partially broken away perspective view of a plastic bearing according to the invention.

Referring now to FIG. 1, a conventional airless spray gun generally indicated at 10 includes a generally parallelogram-like support member 12 that has a flange 14 secured to its lower left-hand side and a flange 16 secured to its upper right-hand side. A fluid operated motor 18 is secured to the left-hand end of flange 14 and is selectively supplied with a fluid pressure to move a piston and its attached rod 20 to the right thus actuating a dispensing fluid valve assembly 22 secured to the right-hand end of flange 14. This actuation causes valve assembly 22 to supply a fluid to be sprayed to a threaded conduit 24 that is fluidly communicated with a turret member housing 26 by threaded fittings 28, 30 and 32. A turret member rotating mechanism 34 is secured to the upper side of flange 16 and is controlled by a fluid motor 36 such that a downwardly extending member 38, whose lower end is received within housing 26, rotates a turret member between a spraying position and a non-spraying position, as will be described.

Referring now to FIG. 2, housing 26 includes a cavity 40 that receives a generally spherical turret member 42. Turret member 42 includes a fluid passage 44, a spraying orifice 46, and an upper squared aperture 48 that receives the lower squared end of member 38 such that the turret member 42 may be rotated between the spraying position, as shown, and a non-spraying position in which spraying orifice 46 faces toward the left and can thus be cleansed of accumulated matter by reverse fluid flow therethrough. Adjacent its right-hand side, housing 26 includes a generally frustroconical spraying aperture 50 and an adjacent generally spherical seat 52 that has a flange seat 54 at its periphery.

A generally disc-like plastic bearing 56, according to this invention, is located between the turret member 42 and the spherical seat 52 and includes an annular spraying aperture 58 having a slightly smaller diameter than the adjacent smallest diameter of spraying aperture 50 of housing 26. As such, with turret member 42 removed from the housing 26, a suitable annular tool may be inserted within spraying aperture 50 to engage the plastic bearing 56 and to move the bearing to the left to thus allow replacement. At its periphery, plastic bearing 56 includes an integral annular flange 60 that engages the flange seat 54 of housing 26. The surfaces of bearing 56 that engage seats 52 and 54 are roughened by etching, or other suitable processes, and frictional engagement between the roughened surfaces and the seats thus holds the bearing in position. The inner surface of plastic bearing 56 is smooth and thus engages turret member 42 with a minimum of friction therebetween. At its left-hand end, the threaded inner bore of housing 26 receives a threaded member 62 that has an Allen wrench receiving fluid passage 64. The right-hand end of member 62 engages a conventional plastic ring 66 which has a spherical seat 68 that cooperates with plastic bearing 56 to support the turret member 42 for rotational movement between the spraying position and the non-spraying position.

Plastic bearing 56 is formed of a suitable plastic such as Mylar, Teflon or nylon. The thin disc-like configuration of the bearing and the generally roughened outer surface and smooth inner surface provide a minimum of plastic deformation, and when such plastic deformation does occur, the bearing is readily accessible for replacement.

The invention thus provides an improved disc-like plastic bearing for a turret member housing of an airless spray gun.

It is claimed:

1. In an airless spray gun, the combination comprising, an apertured housing having a spherical seat adjacent the aperture, a generally spherical turret member received within the housing and including a spraying orifice for spraying a fluid outwardly of the housing through the aperture thereof, a disc-like plastic bearing located between the spherical seat and the turret member and having an aperture adjacent the aperture of the housing, the bearing including a roughened generally spherical outer surface engaging the spherical seat of the housing and a smooth generally spherical inner surface engaging the spherical turret member, turret member support means engaging and rotatably supporting the spherical turret member in cooperation with the plastic bearing, and means for rotating the turret member within the turret member support means and the plastic bearing between a spraying position and a non-spraying position.

2. In an airless spray gun, the combination comprising, an apertured housing including a generally spherical seat adjacent the aperture and a flange seat adjacent the periphery of the spherical seat, a generally spherical turret member received within the housing and having a spraying orifice for spraying a fluid outwardly of the housing through the aperture thereof, a disc-like plastic bearing located between the spherical seat and the spherical turret member and having an integral flange at the periphery thereof, the bearing including an aperture adjacent to and of a smaller size than the aperture of the housing, the bearing including a roughened generally spherical outer surface engaging the spherical seat of the housing and a roughened surface on the side of the flange engaging the flange seat, the bearing including a smooth generally spherical inner surface engaging the spherical turret member, turret member support means engaging and rotatably supporting the spherical turret member in cooperating with the plastic bearing, and means for rotating the turret member within the turret member support means and the plastic bearing between a spraying position and a non-spraying position.

* * * * *